United States Patent [19]

Iwata

[11] 4,235,547
[45] Nov. 25, 1980

[54] PHOTOGRAPHIC CAMERA

[75] Inventor: Hiroshi Iwata, Nara, Japan

[73] Assignee: West Electric Co., Ltd., Osaka, Japan

[21] Appl. No.: 55,033

[22] Filed: Jul. 5, 1979

[30] Foreign Application Priority Data

Jul. 12, 1978 [JP] Japan .................................. 53-085591

[51] Int. Cl.³ .......................... G03B 3/00; G03B 17/20
[52] U.S. Cl. .................................... 354/60 L; 354/198
[58] Field of Search ................ 354/53, 60 L, 198, 289

[56] References Cited

U.S. PATENT DOCUMENTS

| 3,947,862 | 3/1976 | Watanabe et al. ................. 354/60 L |
| 4,147,420 | 4/1979 | Iwata et al. ....................... 354/289 X |

Primary Examiner—Michael L. Gellner
Attorney, Agent, or Firm—Cushman, Darby & Cushman

[57] ABSTRACT

A photographic camera provided with a distance and brightness indicator wherein necessity of an artificial light source can be detected by brightness of a photographic object in a focusing adjustment and a photographic distance is indicated by illumination.

3 Claims, 6 Drawing Figures

FIG. 3(a)
FIG. 3(b)
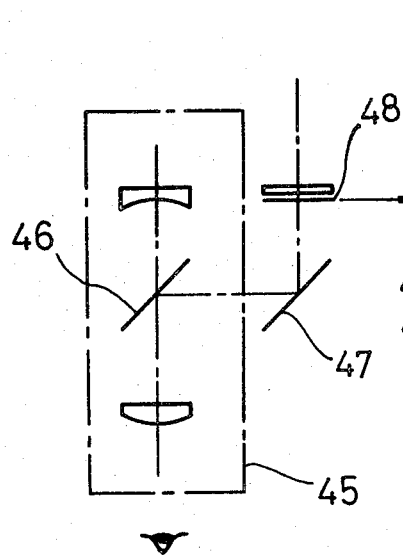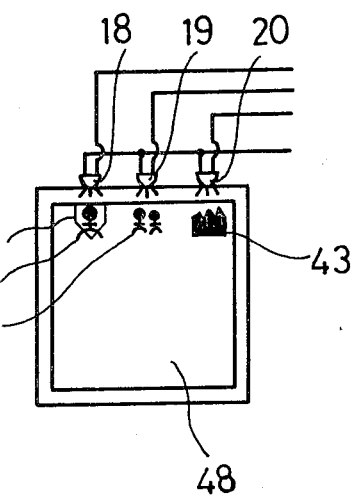
FIG. 4(a)
FIG. 4(b)
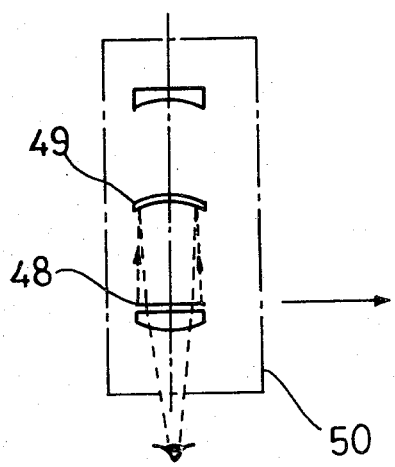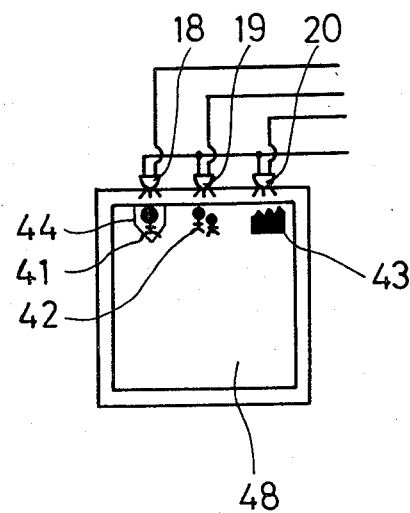

PHOTOGRAPHIC CAMERA

BACKGROUND OF THE INVENTION

1. Field of the Invention

This invention relates to a photographic camera provided with a distance and brightness indicator, in which a distance indication can clearly be confirmed by illumination at a photographing in the dark.

2. Description of the Prior Art

A zone focus adjustment method (sometimes called blind adjustment) is employed for a distance indicator of a compact camera. In the zone focus method, focusing adjustment is performed by setting a main lens for several discrete positions corresponding to object distances instead of a continuous focusing adjustment. The zone focusing method has an advantage in easiness of the focusing adjustment compared with the continuous focusing adjustment. The focusing adjustment is performed by a distance indicator having indications represented by numerals or symbolic marks.

In the U.S. application under serial number 804,808 (now continued under Ser. No. 28, 174), the present invention proposed a distance indication means in which a relevant numeral or symbolic mark corresponding to the objective distance is indicated by illumination. The distance indication means disclosed there is free from a disadvantage that eventual failures occur in focusing adjustment due to erroneous recognition of the indications or difficulties in the recognition of the indications in the dark.

On the other hand, an artificial light means such as an electronic flash called strobe is widely used in the photographing in the dark. In a camera provided with a strobe, an ambient brightness detection means is usually provided in order to confirm the necessity of the strobe when the brightness of the photographic objects is not enough.

SUMMARY OF THE INVENTION

The present invention purports to provide a novel improvement of a photographic camera provided with a distance and brightness indicator, in which brightness of photographic objects is detected for confirmation of necessity of an electronic flash and a distance indication is clearly confirmed by illumination at a photographing in the dark.

BRIEF DESCRIPTION OF THE DRAWINGS

FIG. 3 (*a*) is a top plan view showing a configuration example of a photographic camera of the present invention disposed inside a finder mechanism.

FIG. 3 (*b*) is an enlarged front view of an indication plate provided with symbolic marks and light emitting devices.

FIG. 4 (*a*) is top plan view showing another configuration example of a distance indicator of the present invention disposed inside a finder mechanism.

FIG. 4 (*b*) is an enlarged front view of an indication plate provided with symbolic marks and light emitting devices.

DETAILED EXPLANATION OF THE PREFERRED EMBODIMENTS

The present invention is now explained in detail by referring to the accompanied drawings.

Figure 1:
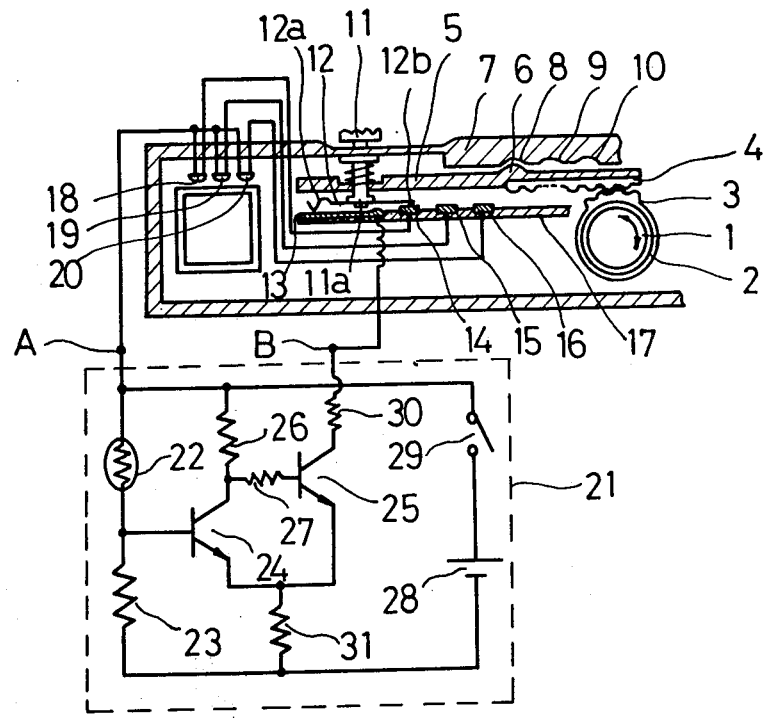
FIG. 1 is a sectional front view of a main part and its associated electric circuit of a distance and brightness indicator for a camera embodying the present invention.

FIG. 1 shows a main part and its associated electric circuit of a distance indicator for a camera embodying the present invention. A lens barrel 2 attached to a main lens 1 is fixed to a camera body 7 by screws (not shown). A pinion 3 is further attached to the outer periphery of the lens barrel 2. A focusing adjustment lever 5 is attached to a rack 4 which engages with the pinion 3. Focusing adjustment of the main lens 1 is accomplished by a lateral sliding motion of a knob 11 attached to the focusing adjustment lever 5. The lateral sliding motion causes a revolutional motion of the main lens 1 by the rack 4 and the pinion 3 resulting in its axial shift of the main lens 1.

A contact lever 12 having electrical contact points 12*a* and 12*b* at both ends is provided at the bottom part 11*a* of the knob 11. A contact bar 13 is provided on a plate 17 so that the electrical contact point 12*a* is electrically contact with the contact bar 13. Contact points 14, 15 and 16 are respectively connected to light emitting devices 18, 19 and 20 such as light emitting diodes or small size incandescent lamps. Along with the lateral sliding movement of the electrical contact point 12*a* on the contact bar 13, the other electrical contact point 12*b* also slides by successively making electrical contacts with contact points 14, 15 and 16.

In addition, a detent 6 engaging with either one of indents 8, 9 and 10 is provided in the focusing adjustment lever 5. The indents 8, 9 and 10 are provided on the internal wall of the camera body 7. Locations of the indents 8, 9 and 10 for clock-stop action are selected in such a manner that the electrical contact point 12*b* is electrically contact with either one of the contact points 14, 15 and 16 on the plate 17 when the detent 6 successively engages with either one of the indents 8, 9 and 10. The contact bar 13 is connected to a terminal B of a brightness check circuit 21. Three light emitting devices 18, 19 and 20 are respectively connected between a terminal A and the respective contact points 14, 15 and 16.

The operation of the mechanical main part of FIG. 1 is as follows:

The photographing distance is roughly divided into three zones, namely, a short distance of about 1 meter, an intermediate distance of about 5 m, and far remote distance. The indents 8, 9 and 10 are formed at the camera body 7 in such a manner that they correspond to the abovementioned three staged distances. The focusing adjustment of the main lens 1 is carried out by sliding the focusing adjustment lever 5 by means of the knob 11. In case of the focusing adjustment for the short distance, for example, the focusing adjustment lever 5 is shifted to a position at which the detent 6 engages with the indent 8. The knob 11 is normally pushed up by a spring. When the knob 11 is pressed down by a photographer's finger at the focusing adjustment for the short distance, the electrical contact point 12*a* of the contact lever 12 becomes in contact with the contact bar 13, while the electrical contact point 12*b* of the contact lever 12 is in contact with the contact point 14. Accordingly, a current flows through the light emitting device 18 to illuminate the indication for the short distance if the brightness check circuit 21 operates and sufficient voltage comes out at the terminals A and B.

The focusing adjustment of the main lens 1 for the intermediate and far remote distances is similarly made by the lateral movement of the focusing adjustment lever 5 by means of the slide action of the knob 11.

The brightness check circuit 21 comprises a photo detector 22 such as photoconductive cell, a first transistor 24, a second transistor 25, a battery 28, a switch 29, and resistors 23, 26, 27, 30 and 31. The operation of the brightness check circuit 21 is hereinafter elucidated by assuming that the switch is closed and that brightness of a light impinging on the photo detector 22 is low, e.g. at night. A resistance of the photodetector 22 is extremely high for the low brightness and thus a voltage across the resistor 23 is low. This means that the first transistor 24 is off. Resistances of the resistors 26 and 27 are selected in such a manner that a base current flows through the resistors 26 and 27 thus turning on the second transistor 25 when the first transistor is off.

Accordingly, a current flow path is formed consisting of the battery 28, the switch 29, the light emitting device 18, the contact point 14, the contact lever 12, the contact bar 13, the resistor 30, the second transistor 25 and the resistor 31, when the knob 11 is at the most leftward position as shown by FIG. 1. The light emitting device 18 is lit up to illuminate the corresponding indication mark. Therefore, the photographer can easily confirm the setting photographing distance of the main lens 1 adjusted by the mechanical means comprising the knob 11, the focusing adjustment lever 5, the rack 4, the pinion 3 and the lens barrel 2.

In case that the photographic distance indicated by the illumination of the light emitting device 18 is not right one for an instant photographic object, other light emitting devices 19 and 20 can be lit up by sliding the knob 11 for the focusing adjustment and changing the electrical contact of the contact lever 12 with the contact point 14. The distance and brightness indicator in accordance with the present invention is so constituted that the second transistor 25 is on when the brightness of a photographic scene is low in the dark and that one of the light emitting devices is lit up to indicate the setting of focusing adjustment by illumination.

On the other hand, when a photographing is made at a bright place, e.g. by daylight, brightness of a light impinging on the photo detector 22 is high and thus the resistance thereof is low. This means that the voltage across the resistor 23 is high thereby turning on the first transistor 24. Accordingly, the base and the emitter of the second transistor 25 are shortcircuited through the resistor 27 and thus the second transistor 25 turns off. Thus no voltage is applied across the terminals A and B. None of the light emitting devices (18, 19 and 20) lights up for indication of the setting of focusing adjustment.

In the brightness check circuit 21, on-and off-operation of the first transistor 24 is controlled by the brightness of the light impinging on the photo detector 22. Therefore, it is possible to check the brightness of photographic objects when the focusing adjustment is made, by constituting the brightness check circuit 21 in such a manner that the first transistor 24 turns off for the brightness necessitating an artificial light and that it turns on for the brightness enough for a photographing without artificial light.

It has been so far assumed that the switch 29 is closed. But it is preferable in a practical configuration for a camera that the brightness check circuit 21 can be operated by closing the switch 29 just before photographing to provide an assurance for the distance confirmation and to avoid unnecessary power consumption. This is accomplished by making the switch 29 interlock with a shutter knob. However, this configuration is not always practical, since it is necessary to press the shutter knob a little and then to move the knob 11 for setting a right focusing adjustment. In order to resolve such unpractical problem, the brightness check circuit 21 can be devised in a manner to comprise a timer circuit as shown in FIG. 2.

Figure 2:
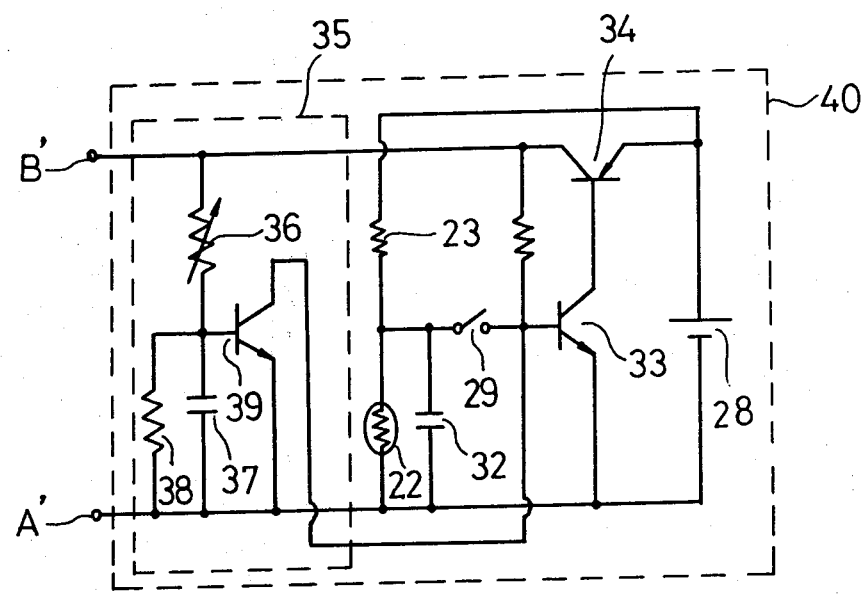
FIG. 2 is an example of a brightness detection circuit used with the main part of FIG. 1.

FIG. 2 shows such embodiment of a brightness check circuit 40 for a distance and brightness indicator in accordance with the present invention. The brightness check circuit 40 comprises a timer circuit 35. The timer circuit 35 controls a voltage supply to the light emitting devices 18, 19 and 20 for a specified time period from a closing of switch 29 by pressing an interlocked shutter knob, when brightness of photographic objects is low. This voltage supply control by the timer circuit 35 is made irrespective of the pressing of the shutter knob, once the switch 29 is closed by pressing the shutter knob. Circuit elements in FIG. 2 with same numerals as those in the brightness check circuit 21 correspond to the circuit elements in FIG. 1. Terminals A' and B' are to be connected to the terminals A and B when the brightness check circuit 40 is used in place of the brightness check circuit 21 in the distance and brightness indicator of FIG. 1.

The operation of the brightness check circuit 40 is made in a similar manner to that of the brightness check circuit 21. When a photographing is made in the dark, a brightness of a light impinging on a photo detector 22 is low and thus the resistance thereof is high. This means that a first transistor 33 turns on when a switch 29 is closed. Accordingly, a second transistor 34 turns on and thus a voltage of a battery 28 is supplied between the terminals A' and B'.

On the other hand, when a photographing is made at a bright place, amount of a light impinging on the photo detector 22 is much and thus the resistance thereof is low. Therefore, the first transistor 33 always turns off and accordingly the second transistor 34 is also off, thereby making no voltage supply from the battery 28 between the terminals A' and B'.

When the second transistor 34 is on and the voltage of the battery 28 is applied between the terminals A' and B', a capacitor 37 is charged through a variable resistor 36 by a certain voltage, for which voltage a third transistor 39 turns on. Then, the base and the emitter of the first transistor 33 are short-circuited and thus the first transistor 33 turns off. Accordingly, the second transistor 34 also turns off and the voltage of the battery 28 is no more impressed across the terminals A' and B'. The capacitor 37 is then discharged until the third transistor 39 turns off. When the third transistor 39 turns off, the first transistor 33 and then the second transistor 34 turn on. This completes one operational cycle of the timer circuit 35. The turn-on period of the third transistor 39 is controlled by a time constant circuit comprising the variable resistor 36 and the capacitor 37. The turn-on period of the first transistor 33 corresponds to the period, during which the voltage of the battery 28 is supplied to the terminals A' and B'.

The timer circuit 35 does not operate when the brightness of the photographic objects is high, since the voltage of the battery 28 is not supplied to the terminals A' and B'.

FIG. 3(a) shows one configuration example of a finder distance indication system. FIG. 3(b) shows an enlarged front view of an indication plate provided with symbolic marks and light emitting devices. A finder 45 mainly comprises a convex lens and a concave lens. A half-mirror 46 is obliquely placed inside the finder 45. Outside of the finder 45, an indication plate 48 and a reflecting mirror 47 for reflecting symbolic marks 41, 42 and 43 in the direction to the half-mirror 46 are also placed as illustrated in FIG. 3(a). Light emitting devices 18, 19 and 20 are placed close to the respective symbolic marks 41, 42 and 43. A pointer 44 is provided to make the distance indication by pointing out one of the symbolic marks 41, 42 and 43. The pointer 44 is interlocked with the focusing adjustment lever 5 of FIG. 1. With this configuration, when the focusing adjustment is made, for example, to a close distance zone, the light emitting device 18 is lit and only the symbolic mark representing the close distance zone is brightly indicated inside the finder viewing field. Similarly, for the intermediate and far remote distance zones, one of the light emitting devices 18, 19 and 20 is respectively indicated.

FIG. 4(a) shows another configuration example of a finder distance indication system. FIG. 4(b) shows an enlarged front view of an indication plate 48 provided with symbolic marks 41, 42 and 43 and light emitting devices 18, 19 and 20. The indication plate 48 and the light emitting devices 18, 19 and 20 for illumination of the symbolic marks 41, 42 and 43 are installed inside a known inverse Galilean type finder 50. A bright frame 49 having a reflecting plate for reflecting the symbolic marks 41, 42 and 43 on the indication plate 48 is disposed in the finder 50 in a manner that the symbolic marks 41, 42 and 43 are reflected by the reflecting plate and is observed inside the finder viewing field. A pointer 44 is similarly provided for the distance indication. It is interlocked with the focusing adjustment lever 5 of FIG. 1. With this configuration, since an image of either one of the symbolic marks illuminated by its corresponding light emitting device among the light emitting devices 18, 19 and 20 is reflected by the reflecting plate of the bright frame 49, it can be observed similarly inside the finder viewing field as in the embodiment example shown in FIG. 3(a) and FIG. 3(b).

What is claimed is:

1. A distance and brightness indicator for a photographic camera comprising:
    a plurality of contact points corresponding to a distance of a photographic object,
    an indication means comprising several light emitting devices connected to said contact points,
    a brightness check circuit comprising a power supply source for said light emitting devices, a photo detector for detection of brightness of said photographic object, and a switching circuit for a control of voltage supplying of said power supply source with respect to said brightness of said photographic object, whereby
    said light emitting devices are connected to said power supply source through said brightness check circuit and corresponding one of said contact points.

2. A distance and brightness indicator for a photographic camera of claim 1, wherein
    said brightness check circuit further comprises a timer circuit for controlling an operational time of said switching circuit.

3. A distance and brightness indicator for a photographic camera of claim 1, wherein said brightness check circuit further comprises a switch which is interlocked with a shutter knob and is closed at a slight press of said shutter knob.

* * * * *